Patented Oct. 19, 1926.

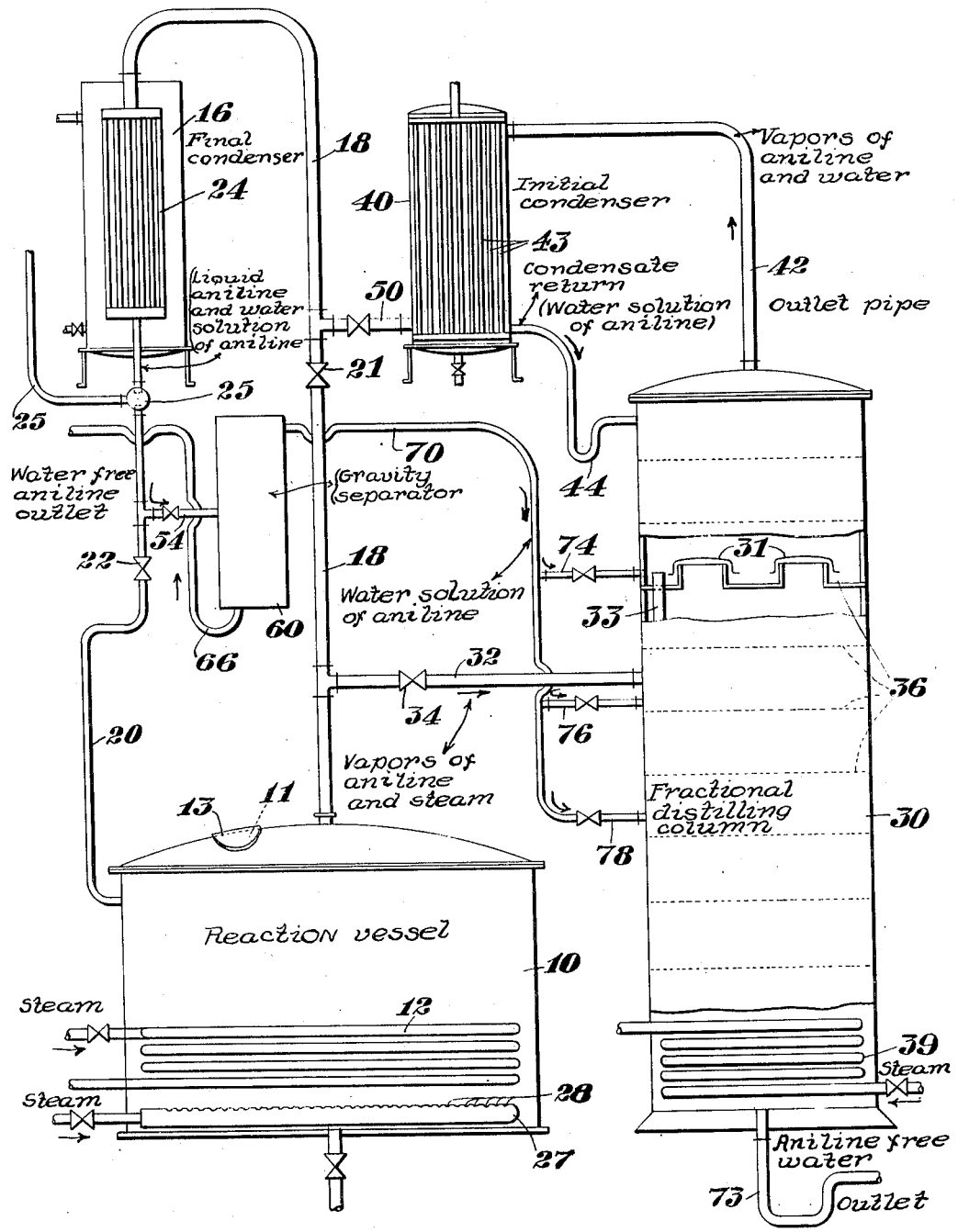

1,603,851

UNITED STATES PATENT OFFICE.

WALTER E. LUMMUS, OF LYNN, MASSACHUSETTS.

PROCESS OF SEPARATING VOLATILE CHEMICALS.

Application filed August 27, 1920. Serial No. 406,363.

This invention relates to a process of separating one volatile chemical from a second volatile chemical with which it is associated and in which it is partially soluble.

It is well known that certain volatile chemicals, of which aniline may be taken as an example, are partially soluble in other chemicals, of which water may be taken as an example. At ordinary temperatures aniline will dissolve in water to the extent of about three per cent. In the manufacture of such chemicals and in other instances it becomes desirable to separate the one volatile chemical from the second volatile chemical with which it is associated and in which it is slightly soluble. In the manufacture of aniline the problem of separating aniline from water without producing simultaneously large quantities of dilute water solution of aniline has presented considerable difficulty, inconvenience and expense, as will be apparent from a discussion of the normal procedure followed in the manufacture of aniline.

Heretofore the usual method of producing aniline contemplated the reduction of nitro-benzene with iron filings and hydrochloric acid. The reducing reaction was carried out in a reaction vessel heated by steam and to which a reflux condenser was connected for the purpose of returning into the reaction vessel the mixtures of aniline and nitro-benzene which were distilled during the reaction. The reaction was continued until the nitro-benzene was completely reduced to aniline. The reaction vessel was then operatively connected with condensers and with a gravity separator so that upon steam distillation of the aniline and the condensing of the vapors of steam and aniline, an emulsion or mixture was obtained which comprised aniline and a solution of aniline in water. By the use of the gravity separator the water-free aniline was obtained, leaving a considerable quantity of valuable aniline in the water solution of aniline. Attempts to recover the aniline thus contained in this water solution of aniline have been confined to the introduction of the solution to boilers for the purpose of generating steam for the steam distillation of the next charge in the reaction vessel, the object being to recover in this manner as much as possible of the dissolved aniline from the solution. This procedure required the employment of separate steam generators for the aniline. Other attempts to recover this aniline have contemplated the installing of salting out tanks and additional stills for the treatment of the relatively weak solution of aniline in water. A number of practical objections have been found to this procedure, among which may be enumerated the excessive amount of steam required, the additional capital required for the recovery plant, the general cumbersome nature of the operation, and the additional expense of the recovery operation.

The primary object of the present invention is to provide a process by which one volatile chemical may be completely separated from a second volatile chemical, with which it is associated and in which it is partially soluble, in a superior and more economical manner than has heretofore been possible.

A further object of the invention is to provide a process whereby aniline may be separated from water in an improved and superior manner.

A still further object of the invention is to provide a continuous process for the production of substantially water-free aniline.

To these ends the invention consists in the process hereinafter described and particularly defined in the claim.

In the drawing, a diagrammatic layout of the apparatus for practicing the present process is shown.

The invention is preferably embodied in a process of separation of aniline from water with which it is associated in the manufacture of substantially water-free aniline from nitro-benzene and is described in detail as follows: Referring to the drawing, iron filings, hydrochloric acid and nitro-benzene are introduced in their usual proportions into the reaction vessel 10 through a port or opening 11 in the top thereof. During the distillation operation the opening 11 is closed by a cover 13. The reaction vessel 10 comprises a cast-iron tank of special construction and sufficiently strong to withstand the vapor pressures and mechanical action encountered. Heat is supplied for the purpose of starting and carrying on the reaction by means of steam which is conducted from any convenient source of supply, not shown, to the closed steam coils 12 located within the reaction vessel 10. The reaction vessel 10 is operatively connected with a reflux condensing system comprising a condenser 16 connected by pipes 18 and 20 leading from and returning to the reaction vessel, as illustrated in the drawing. Valves 21, 22 in the pipes 18 and 20 respectively are normally opened during the progress of the reaction of reducing the nitro-benzene to aniline, so that as mixtures of aniline and nitro-benzene are distilled off the vapors are conducted upwardly through the pipe 18 to the condenser 16, where they are condensed and returned through the return pipe 20 to the reaction vessel 10. The construction of the condenser 16 may be of any usual or preferred form, that shown in the drawing comprising vertical tubes 24 within the condenser 16 through which the vapors are passed and around which cooling water is circulated. The condenser is provided with the usual vent 25.

After the completion of the reducing reaction and after all of the nitro-benzene has been reduced to aniline, the valves 21, 22 in the outlet and return pipes 18 and 20 respectively are closed and the aniline is thereafter distilled with steam. For this purpose live steam is introduced into the reaction vessel 10 from a source of supply, not shown, through the header 27 provided with a plurality of perforations or holes 28 therein from which the live steam escapes into the body of aniline within the reaction vessel 10. Provision is made for completely separating the aniline from the steam so that substantially water-free aniline may be obtained. For this purpose the vapors of aniline and steam are conducted from the reaction vessel 10 to a fractional distilling column 30 through the pipe 32, a valve 34 in the pipe 32 being opened at this time. The fractional distilling column 30 may be of any usual or preferred construction, having the usual plurality of decks 36 which subdivide the column into a series of compartments. Each deck is provided with boiling caps 31 and down pipes 33, one of which is diagrammatically shown in the drawing. During the operation of the column, water solutions of aniline of varying concentrations stand in the usual manner upon each deck and as the vapors of aniline and steam pass into the column from the pipe 32, heat supplied by a steam coil 39 at the bottom of the column operates to distill the aniline from the solution upon one deck and to cause it to pass and be absorbed within the solution upon the next higher deck. The operation of the column is controlled so that the proportion of steam to the aniline is reduced as the vapors pass through the tower so that the exit vapors from the tower contain a minimum quantity of steam. In practical operation it is possible to control the operation of the column to produce vapors in which the proportion of aniline to steam approximates three parts of water to one part of aniline. The vapors from the top of the column are conducted through the outlet pipe 42 to an initial condenser 40 comprising a jacket within which cooling water is circulated by a bundle of pipes 43. The initial condenser 40 operates to condense a considerable portion of the steam in the distillate and upon condensation of this steam, the water thus formed dissolves approximately three per cent of aniline by weight. This condensate is returned through the pipe 44 to the column and the aniline contained therein is again subjected to re-distillation during the continued operation of the column.

The uncondensed vapors pass through the condenser 40 and are conducted through an outlet pipe 50 into the upper portion of the pipe 18 through which they are led to the final condenser 16. As the vapors are condensed by the condenser 16, the condensate comprising an emulsion or mixture of liquid aniline and a solution of aniline in water passes downwardly through the return pipe 20, through the pipe 54 and into a gravity separator 60. The gravity separator 60 may be of any usual or preferred construction and comprises a tank with means for drawing off separately the water solution and aniline layers through suitable outlets. By means of the gravity separator, the condensate is separated into two layers, the lower layer constituting the substantially water-free aniline and the upper layer constituting a solution of aniline in water of approximately three per cent concentration of aniline. The lower layer of substantially water-free aniline is continuously drawn from the bottom of the gravity separator through a pipe 66 by which it is conducted to storage tanks, not shown. The upper layer, comprising approximately a three per cent solution of aniline in water, is returned through the pipe 70 and through any desired one of the pipes 74, 76 and 78 to an intermediate point of the column, where the aniline contained in the solution is again subjected to the distilling operation of the column.

It will therefore be observed that substantially water-free aniline is continuously and economically obtained by the operation of the present process, and also that the total quantity of aniline distilled or supplied to the column is eventually recovered as substantially water-free aniline.

In the steam distillation of aniline, the relative proportion of aniline to steam theoretically comprises three parts of steam to one part of aniline. The fractional distilling column 30 is operated so that this proportion is maintained as nearly as possible. It will therefore be apparent that for each part of aniline distilled as an immiscible liquid there will be three parts of steam, but that upon condensation of the steam the three parts of water thus formed will dissolve approximately three per cent of aniline by weight or nine one-hundredths parts of aniline. If this three per cent solution of aniline in water were permitted to accumulate, it would result in large quantities of a liquid containing a valuable proportion of aniline, approximating eight to nine per cent of the total aniline originally distilled. The present process prevents the accumulation of large quantities of such dilute solutions of aniline and at the same time enables the aniline to be recovered in a superior and continuous manner without the necessity of additional apparatus. A minimum amount of water is employed in the present process for the distillation of a given quantity of aniline and the excess water in the system is removed from the fractional distilling column 30 through the outlet 73 after having been freed from aniline by the heat supplied by the steam coil 39 at the base of the column.

While the invention has been illustrated and described as embodied in a process and apparatus for the separation of aniline from water with which it is associated in the manufacture of aniline, it will be apparent that the invention may be embodied in processes for the separation of other chemicals of similar characteristics.

Having described the invention, what is claimed is:

The continuous process of separating aniline and water which consists in distilling the substance in a fractionating still, water being discharged at the bottom and vapors of aniline and water being discharged at the top, subjecting the vapors to partial condensation, returning the condensate to the still, subjecting the effluent vapors to complete condensation, collecting the condensate in a gravity separator where it is separated into two portions consisting of water-free aniline and a solution of aniline, drawing off the aniline and returning the solution to the still.

WALTER E. LUMMUS.